Oct. 23, 1951 W. G. HOELSCHER 2,572,479
LATHE SPINDLE SPEED CONTROL MECHANISM
Filed Sept. 8, 1948 6 Sheets-Sheet 1

INVENTOR.
William G. Hoelscher
BY
Wood, Arey, Herron & Evans
ATTORNEYS.

Oct. 23, 1951     W. G. HOELSCHER     2,572,479
LATHE SPINDLE SPEED CONTROL MECHANISM

Filed Sept. 8, 1948     6 Sheets-Sheet 2

INVENTOR.
William G. Hoelscher
BY
Wood, Arey, Herron & Evans
ATTORNEYS.

Oct. 23, 1951 W. G. HOELSCHER 2,572,479
LATHE SPINDLE SPEED CONTROL MECHANISM
Filed Sept. 8, 1948 6 Sheets-Sheet 3

INVENTOR.
William G. Hoelscher
BY
Wood, Arey, Herron & Evans
ATTORNEYS.

Oct. 23, 1951  W. G. HOELSCHER  2,572,479
LATHE SPINDLE SPEED CONTROL MECHANISM
Filed Sept. 8, 1948  6 Sheets-Sheet 4

INVENTOR.
William G. Hoelscher
BY
Wood, Arey, Herron & Evans
ATTORNEYS.

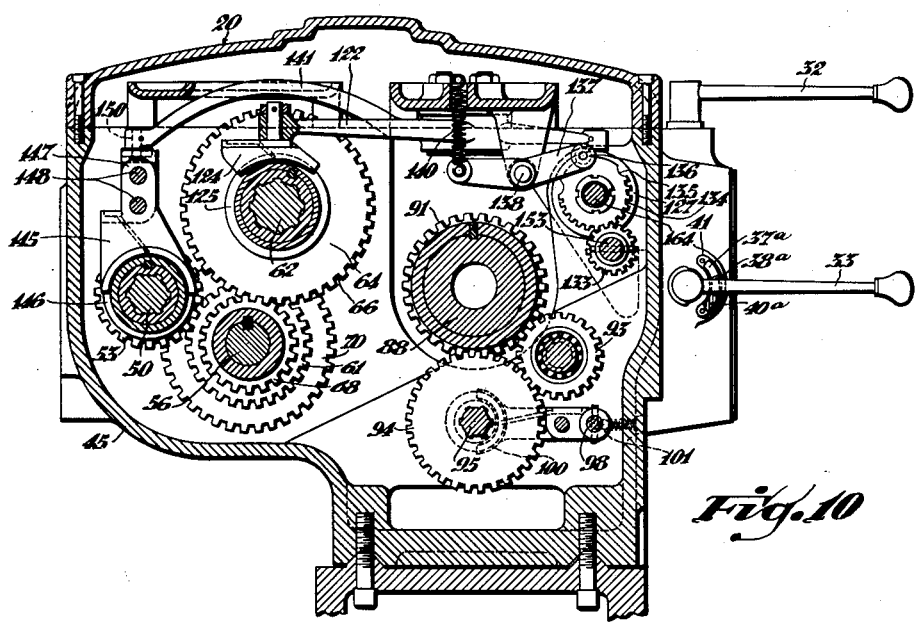
Fig. 10
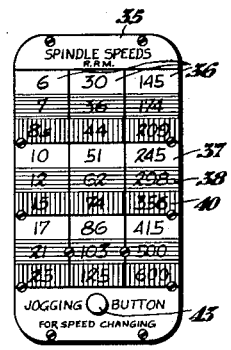
Fig. 11
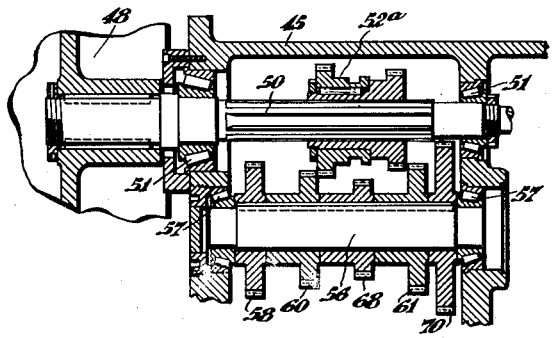
Fig. 12
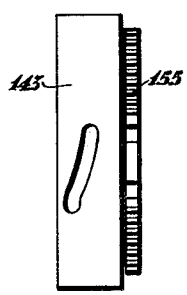
Fig. 13
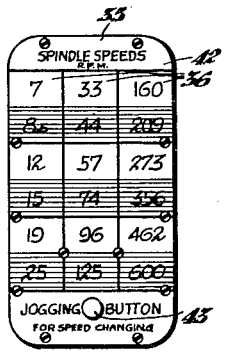
Fig. 14

INVENTOR.
William G. Hoelscher
BY
Wood, Arey, Herron & Evans
ATTORNEYS.

Patented Oct. 23, 1951

2,572,479

UNITED STATES PATENT OFFICE 2,572,479

LATHE SPINDLE SPEED CONTROL MECHANISM

William G. Hoelscher, Cincinnati, Ohio, assignor to The American Tool Works Company, Cincinnati, Ohio, a corporation of Ohio Application September 8, 1948, Serial No. 48,246

8 Claims. (Cl. 116—115.5)

This invention relates to machine tools and particularly to improvements in the speed change gear train and the selector mechanism of a lathe head stock for selecting quickly and conveniently the desired spindle speed.

It is customary practice to provide a wide range of lathe spindle speeds in order to rotate the work at a cutting speed recommended for the work diameter, material, type of cutting tool, and other determinant factors. To achieve maximum efficiency it is important that the head stock be capable of speedy and convenient spindle speed selection in setting up the lathe for the various jobs. For this purpose the head stock transmission is provided with shiftable range selection gears in combination with speed selection gears to provide several ranges and individual speeds within the ranges. An example of this arrangement is disclosed in the patent to William G. Hoelscher, No. 2,332,381, issued October 19, 1943. This transmission may be assembled to provide either twenty-seven, eighteen or nine speeds by making a relatively simple change in the gear train. The manufacturer thus is able to standardize the head stock and may alter it to provide the required number of speeds to suit customer requirements. The present structure follows generally the principles disclosed in this prior patent and is designed to provide speedier and more convenient selectivity and improved performance.

Briefly, the present structure embodies a transmission having three speed selector levers individually connected to the range and speed change gears and arranged to be operated individually but in combination with one another in such manner that primary and secondary range changes and individual speeds are selected individually by shifting the levers relative to the positions indicated by a speed indicating plate mounted in operating relationship with the levers.

A primary object of the invention has been to improve the speed efficiency and general performance of the transmission by the use of individually shiftable control levers which are operable to select the desired range and speed directly instead of progressing through a series of speed changes to reach the desired gear combination.

In its preferred embodiment, the speed selection unit includes an indicating plate having several vertical columns of figures indicating individual spindle speeds. A horizontally movable lever swings relative to the vertical columns to establish a speed or range selection which includes all the speeds in a given column. A secondary speed or range selector lever swings vertically and has a series of positions for secondary range selections. Another speed selection is made by a vertically movable lever similar to the secondary range lever, which moves in registry with several horizontal groups of speed indicating figures on the indicating plate. The final spindle speed therefore is determined by the position of this lever combined with the positions of the primary and secondary range selector levers. In making a speed selection, it is not necessary to pass sequentially through a series of speeds to reach the one desired or to operate the levers in any particular sequence, and in many cases, the operator need shift but one or two levers to make the desired selection. This increases the efficiency and speed of selection and avoids the difficulty of passing through one or more sets of change gears and the physical difficulty of meshing and unmeshing a series of gears.

A further object of the invention has been to provide a simplified and easily operated system of selector levers in combination with a speed index plate to provide individual lever operation correlated to the index plate for direct reading of spindle speeds for various lever combinations.

Still another object has been to provide a simplified direct acting mechanism connecting the several selector levers with the shiftable gears to provide smooth and easy shifting, to reduce the number of parts, and to permit the manufacturer to convert the head stock for various speed combinations with a minimum of alteration.

Further objects and features of the invention will be more fully disclosed with reference to the specification in connection with the drawings.

Figures 4 to 7 inclusive are developed views of the various gear shifting cams.

Figure 3:
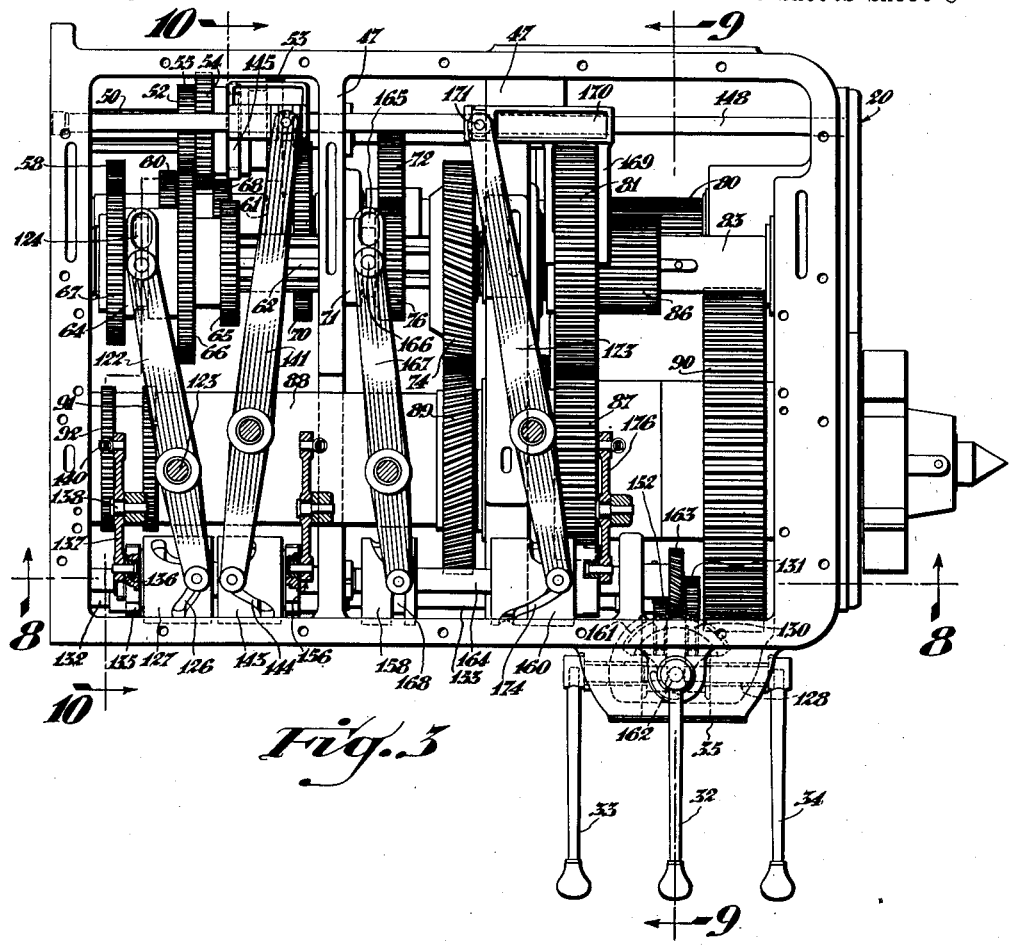
Figure 3 is a top plan view of the head stock with the cover plate removed to illustrate the general structure and arrangement of the transmission.
Figures 8, 9:
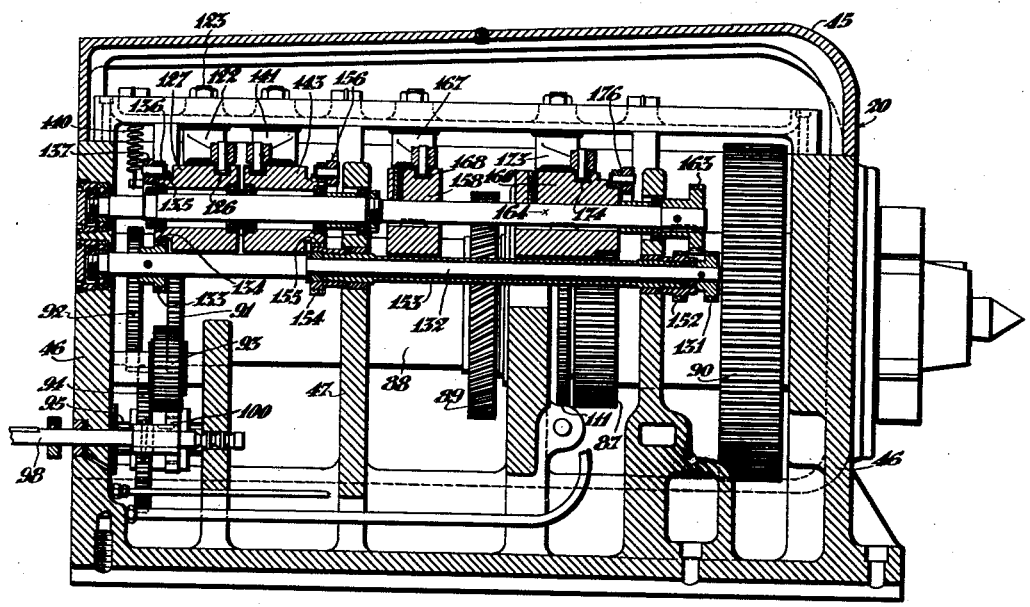

Figure 8 is a sectional view taken on line 8—8, Figure 3, illustrating the mounting and actuating mechanism for the cams.

Figure 9 is a sectional view taken on line 9—9,

Figure 3, illustrating the selector levers, cam driving gears and shifter levers in conjunction with the transmission.

Figure 10 is a sectional view taken on line 10—10, Figure 3, detailing another portion of the gear shifting apparatus.

Figure 11 is a face view of one of the speed indicating panels.

Figure 2:
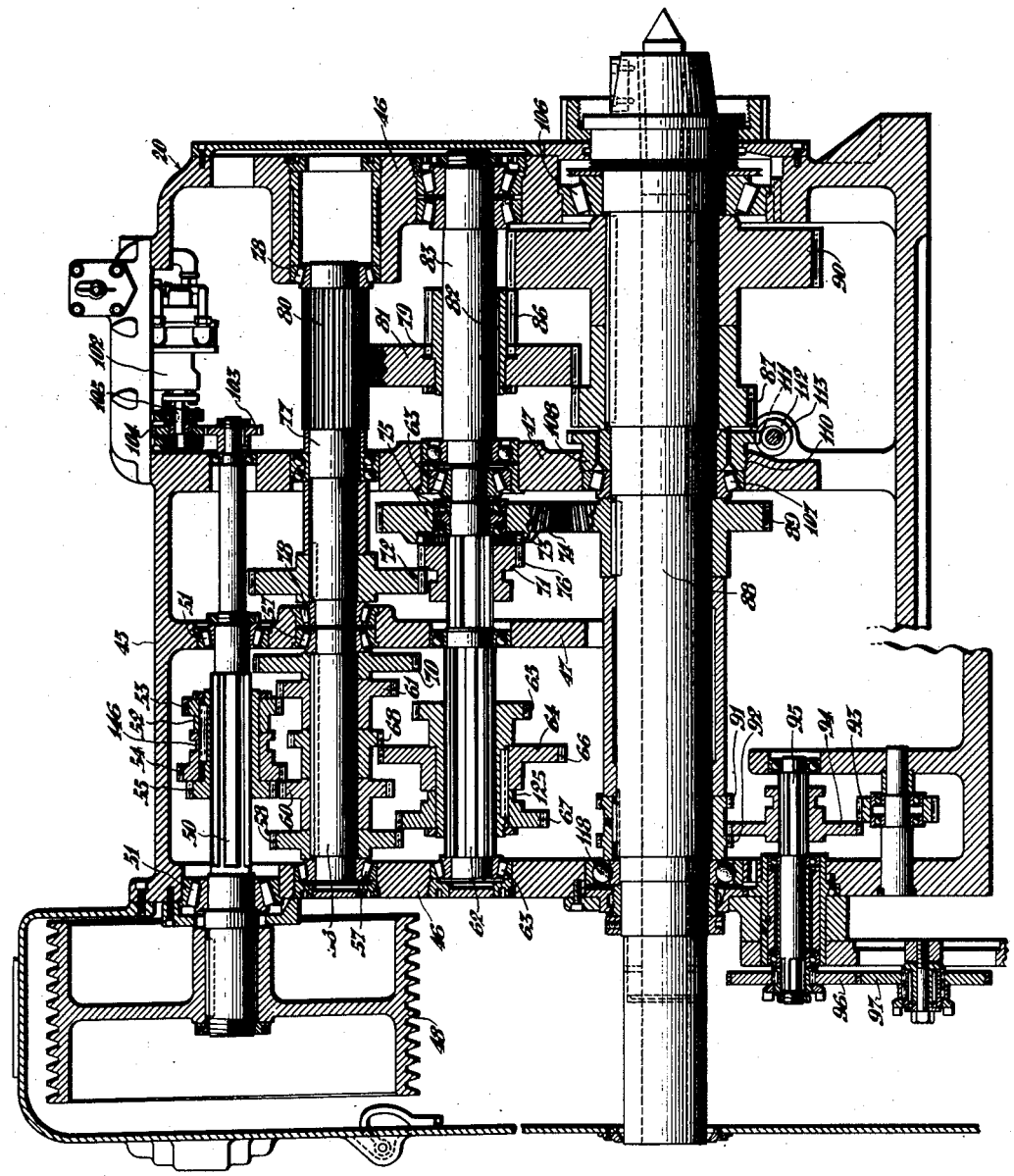
Figure 2 is a developed sectional view of the head stock gear train, the various transmission shafts and component gears being located in a common plane for convenience of illustration.

Figure 12 is a fragmentary sectional view illustrating a portion of the transmission with a two speed interchangeable compound gear installed in place of the three speed gear shown in Figure 2, to provide eighteen speed changes instead of twenty-seven.

Figures 4, 5, 6, 7:
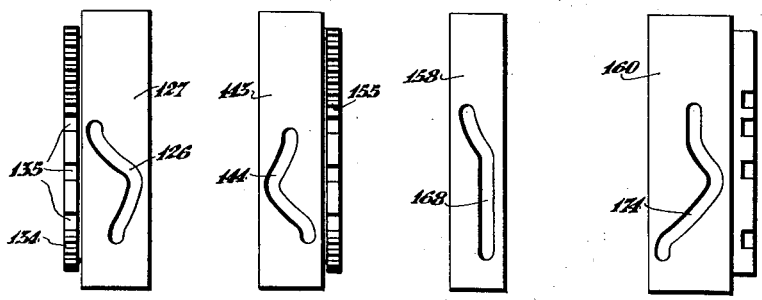

Figure 13 is a developed view of the cam which is installed in conjunction with the two speed interchangeable gear shown in Figure 12, in place of the cam illustrated in Figure 5.

Figure 14 is a face view of the speed indicating panel which is used in conjunction with the eighteen speed transmission.

Figure 15:
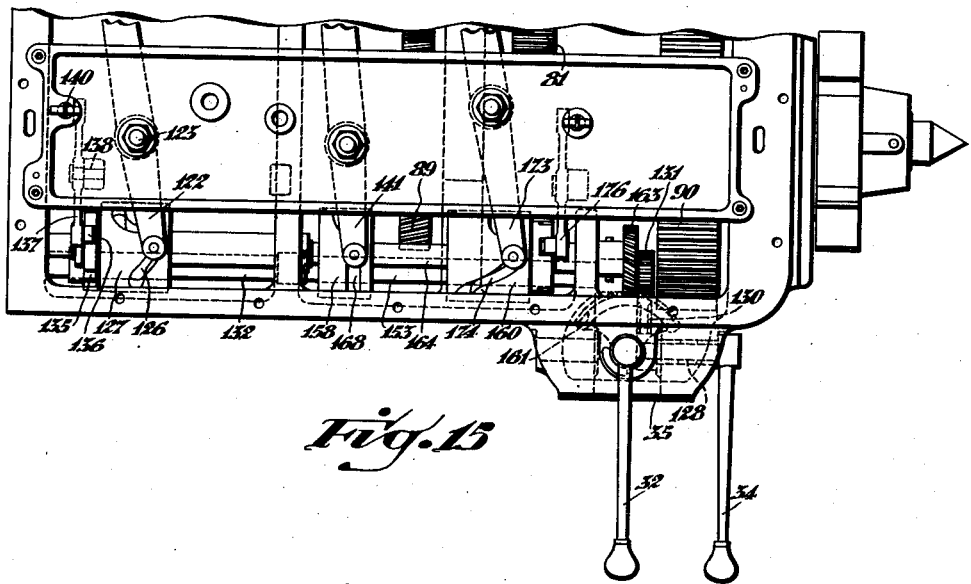

Figure 15 is a fragmentary top plan view similar to Figure 3, illustrating the cam and lever arrangement for the nine speed transmission.

Figure 16:
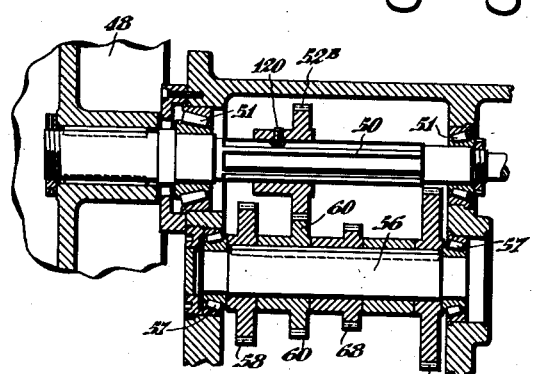

Figure 16 is a fragmentary sectional view similar to Figure 12, with the interchangeable shiftable gear omitted and a fixed gear installed on the input shaft to provide nine speeds instead of eighteen as previously described.

Figure 17:
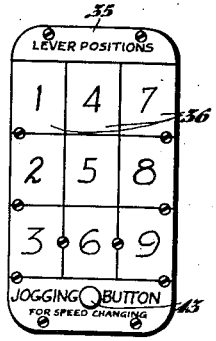

Figure 17 is a face view of the speed indicating panel which is used in conjunction with the transmission when it is arranged for nine speeds.

Figure 1:
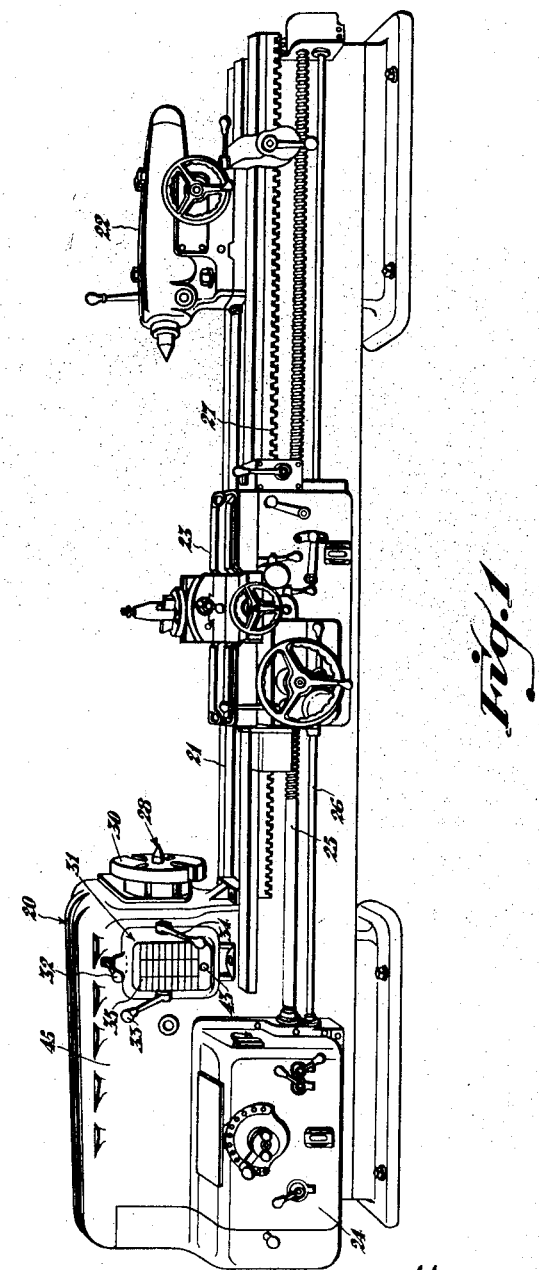
Figure 1 is a general perspective view illustrating a lathe incorporating the improved head stock.

Referring to Figure 1, the improved head stock indicated generally at 20 is incorporated in a lathe having the usual bed 21, tail stock 22 and carriage 23. A feed box 24 is mounted to one side of the head stock in driving connection with the head stock gear train to control the speed of the lead screw 25 and feed rod 26. The carriage includes a gear train which is driven by feed rod 26 and which meshes with the rack 27 to translate the carriage longitudinally relative to the bed. The carriage further includes a nut which is engageable with the lead screw 25 for feeding the carriage by power from the lead screw. The head stock includes a spindle indicated generally at 28 which may include the usual face plate 30. The head stock provides a series of spindle speeds which are selected by means of the speed change unit generally indicated at 31. The feed box 24 is powered by a gear train which is directly connected to the spindle 28 so that the carriage feed rate is correlated to the spindle speeds.

Speed selector system

As shown in Figures 1, 3 and 10, the various spindle speeds are selected by means of three levers which are pivotally mounted relative to the speed control unit 31. Of these, lever 32 may be designated a primary range selector and 33 a secondary range selector. Lever 34 is a speed selector lever and operates in conjunction with lever 32 and 33 to determine the final spindle speed selection dependent upon the position of levers 32 and 33. These levers are positioned in accordance with a speed indicating plate 35 which is mounted at the face of speed control unit 31 to indicate the various positions of the three levers for the various speeds. As shown in Figure 11, illustrating the indicator plate for a twenty-seven speed transmission, the plate 35 is provided with three vertical columns 36 of speed indicating figures. Lever 32, which swings in a horizontal path, has three positions corresponding to the vertical columns 36 and is positioned in alignment with these columns to select the range.

In making a speed selection, the primary range selector lever 32 first is shifted to a position in alignment with the vertical column of range speeds which includes the required spindle speed. For example, if the transmission is to be set for 86 R. P. M., lever 32 is swung into alignment with the central column. The plate includes also three horizontal groups of figures corresponding to the positions of lever 34. There are three rows of figures in each group and these rows each are individualized by three stripes of distinguishing colors indicated at 37, 38 and 40. The distinguishing colors are duplicated in each horizontal group. As shown in Figure 10, the secondary range selector lever 33 swings in a vertical path relative to a color index plate 41 bearing three colors, indicated at 37a 38 a and 40a, corresponding to the colors of the indicating plate. Lever 33 is swung to a position in registry with the color block 37a corresponding to the color stripes 37, the lower one of which includes the 86 R. P. M. indication. The final spindle speed selector lever 34 next is swung downwardly into alignment with the lower horizontal group of figures which includes 86 R. P. M. By means of these three levers the various shiftable gears are meshed in the proper combination to deliver by desired spindle speed as hereinafter disclosed in detail. It will be apparent that the levers may be shifted in any desired sequence convenient to the operator.

When the transmission is assembled to provide eighteen speeds instead of twenty-seven, the lever arrangment is substantially the same as above outlined. However, in place of the three color arrangement, the speed index plate 42 is provided with two color ranges as shown in Figure 14. In this instance, the color selector lever 33 becomes a two position lever, operating in conjunction with the colors of the plate 42. Thus there is provided three primary range positions for lever 32, two secondary range selection positions for lever 33, and three final speed selecting positions for lever 24, totalling eighteen spindle speeds. When the transmission is assembled to provide nine speeds the color selector lever 33 is omitted as shown in Figure 15. The speed index plate in this instance is provided with nine positions as shown in Figure 17; three for the primary range selector lever 32 and three for the final speed selector lever 34, thus providing a total of nine spindle speeds.

To facilitate meshing the various gears, a jogging button indicated at 43 (Figure 11) is provided at the front of the speed control unit. This button is in electrical connection with the main motor through an electrical component connected to the motor to jog or momentarily energize the motor. When the operator encounters difficulty in meshing the gears during selection, he depresses the jogging button to cause the motor to partially rotate the gears of the transmission to reposition the gear teeth for engagement with the mating gear teeth. By reason of the individual levers, the gear selections for the various combinations are made directly so that it is not necessary to pass sequentially through a number of gear changes to reach the desired speed selection. This, in combination with the jogging apparatus, provides maximum speed and convenience in arriving at the gear ratio for the desired spindle speed.

Speed change transmission

Described with reference to Figure 2, illustrating the transmission assembled to provide twenty-seven speeds, the transmission casing 45 includes end walls 46—46 and intermediate webs 47 to provide bearing supports for the various transmission shafts and spindle. The transmission unit is bolted to the inner ways of the lathe bed as shown in Figure 10. Power is transmitted from the main motor (not shown) to the head stock by means of multiple V-belt pulley 48 keyed to the input shaft 50 which is journalled in roller bearings 51—51 mounted in the casing 45. A shiftable primary compound gear 52 including gears 53, 54 and 55 is slidably splined to the input shaft 50. An intermediate shaft 56, journalled on roller bearings 57, is mounted parallel to shaft 50. A series of gears, mating with shiftable gear 52, is keyed to shaft 56. The shiftable compound gear 52 is slidable to three positions by means of the secondary range selector lever 33 as hereinafter described. It is to be noted that the shiftable gears all are shown in a neutral position in Figure 2. When compound gear 52 is shifted to the extreme left as viewed in Figure 2, gear 55 meshes with gear 58 in the intermediate position, gear 54 meshes with gear 60 and in its right hand position gear 53 meshes with gear 61. The shiftable compound gear therefore drives intermediate shaft 56 at three different speed rates.

A second intermediate shaft 62, journalled in roller bearings 63—63, is rotatably journalled parallel with shaft 56. A three position compound gear unit 64 is slidably splined to shaft 62 and is provided with three speed change gears 65, 66 and 67. Speed change gear unit 64 is shifted by means of the spindle speed selector lever 34 as hereinafter described. When the unit 64 is shifted to the left as viewed in Figure 2, gear 67 meshes with gear 58. In its intermediate position, gear 66 meshes with gear 68, and in its extreme right hand position gear 65 meshes with gear 70. The shiftable compound gear unit 64, in combination with the shiftable unit 52, provides nine speed changes from shaft 50 to shaft 62.

Shaft 62 further is provided with a clutch and gear unit 71 which is slidably splined thereon and which is shiftable by means of the primary range selector lever 32, either into mesh with gear 72 or directly into clutching engagement with the internal clutch teeth 73 formed on gear 74 which is loosely journalled upon ball bearings 75 mounted on shaft 62. The clutch and gear unit 71 includes gear teeth 76 and when shifted to the left these provide a meshing engagement with the teeth of gear 72. When the unit 71 is shifted to the left into mesh with gear 72, gear 72 drives shaft 77 which is loosely journalled on roller bearings 78—78 and which includes an elongated gear 80.

A shiftable compound back gear unit 79 includes a gear 81 in constant mesh with gear 80. Gear unit 79 is keyed as at 82 to an idler shaft 83 and includes a pinion 86. When the unit 79 is shifted to the left, gear 81 meshes with a pinion 87 keyed to the lathe spindle 88, and when it is shifted to the right, pinion 86 meshes with a gear 90, likewise keyed to the spindle 88. Spindle 88 is journalled in ball and roller bearings as hereinafter disclosed. When the gear and clutch unit 71 is shifted to the right to engage the clutch teeth of gear 74, the gear and pinion unit 80 automatically is shifted to a neutral position as shown in Figure 2 and the drive is from gear 74 to a gear 89 which is keyed to the spindle 88.

From spindle 88 there is provided a power take-off to drive the feed box 24. For this purpose a pair of gears 91 and 92 is keyed to the rearward end of the spindle. An idler gear 93 is in constant mesh with gear 91 and a slidable reversing gear 94 is adapted selectively to mesh either with gear 92 or idler gear 93. Reversing gear 94 is slidably splined upon an output shaft 95, the outer end of which is provided with an output gear 96 meshing with an idler gear 97. Idler gear 97 forms a part of the gear train leading to the feed box transmission.

As shown in Figure 8 a shifter rod 98 includes a yoke 100 engaging the reversing gear 94. A detent 101 (Figure 10) engages the inner end of shaft 98 to latch the reversing gear either in neutral, forward or reverse positions. When the gear 94 is meshed with gear 92, the feed box is driven in the forward direction. When it is meshed with idler gear 93 the power is transmitted from gear 91 to idler 93 to reversing gear 94 which is in mesh with the idler in this position, thereby driving the shaft 95 in the reverse direction.

As shown in Figure 2, the transmission is provided with a lubricant pump 102 which distributes lubricant to the various gears and bearings of the transmission. This pump is driven by a gear 103 keyed to the power input shaft 50 and meshing with driven gear 104 keyed to the pump shaft 105. This provides constant operation of the lubricant pump at a uniform speed whenever the head stock is running.

The spindle 88 is journalled at its forward end upon a pair of tapered roller bearings 106 and 107. Since it is important to provide anti-friction bearings and to eliminate looseness, adjustment means are provided for conveniently adjusting the bearings 106 and 107 to take up for wear and looseness. For this purpose the outer race of bearing 107 is engaged by a nut 108 screwthreaded into the web 47 as at 110. The outer end of the nut includes a flange 111 having gear teeth meshing with a worm 112 which is secured upon a shaft 113. As shown in Figure 9, shaft 113 is journalled in lugs 114—114 forming a part of the intermediate web 47 and the outer end of the shaft is journalled in the front wall of the casing 45. Shaft 113 includes a squared end 115 covered by a removable closure cap 116. When bearing adjustment is necessary, cap 116 is removed and a suitable instrumentality is slipped upon the squared end of the shaft. Rotation of the shaft is transmitted through worm 112 causing rotation of the nut 108 which in turn forces the outer race of bearing 107 rearwardly to compensate for wear. The rearward end of spindle 88 is journalled in a ball bearing 118 which resists radial loads only.

Summary of gear train operation

The drive from the input shaft 50 is transmitted to shaft 56 by the three speed shiftable compound gear 52 and from shaft 56 to shaft 62 through the three speed shiftable component gear unit 64. Shaft 62 may be coupled directly to gear 74 by the clutch and gear unit 71 to drive spindle 88 through gear 89. If the clutch and gear unit 71 is shifted to mesh with gear 72, the power is transmitted from shaft 62 to shaft 77 and from shaft 77 to idler shaft 83 to drive the spindle either from gear 81 to pinion 87 or from pinion 86 to gear 90. In order to prevent interference, the back gear unit 79 and clutch and gear unit 71 are interconnected and are operated in common from the range selector lever 32. The arrangement is such that the back gear unit 79 is in neutral when the clutch and gear unit 71 is in direct clutching engagement with gear 74. When the clutch and gear unit is in mesh with the gear 72, the back gear unit 79 is free to be shifted in either direction to establish a meshing engagement either with pinion 87 or gear 90.

When the transmission is assembled to deliver eighteen speeds instead of twenty-seven, a two speed shiftable component gear 52a is installed on the shaft 50 as shown in Figure 12, instead of the three speed gear illustrated in Figure 2. Also, a modified two position shifting cam (Figure 13) is installed instead of the three position cam used for gear 52. In order to provide the nine speed transmission the shiftable gear 52 is omitted entirely and instead a single fixed gear 52b is installed on shaft 50 as shown in Figure 16. Gear 52b (Figure 16) is fixed to shaft 50 by means of a set screw 120 and is in constant mesh with the gear 60. The cam utilized for shifting gears 52 and 52a is omitted entirely in this instance. As shown in Figure 15, the lever 33 which actuates the shiftable compound gears 52 and 52a, together with its actuating cam also is omitted from the nine speed assembly.

*Gear shifting mechanism*

As noted with reference to the gear train, the twenty-seven speed transmission includes shiftable gear units 52, 64, 71 and 79. Each of these several gears, as shown in Figure 3, are selectively shifted by means of an individual shifter lever having one end engaged with the shiftable gear and the opposite end connected to the track of a cam which shifts the various levers to the required positions for meshing the gears. The cams for gear units 52 and 64 are actuated independently of each other by selector levers 33 and 34, while the cams for the units 71 and 79 are actuated in common by lever 32 to provide automatic interaction of the two units. As shown, the three position shiftable compound gear 64 is controlled by the shifter lever 122 which is pivoted as at 123 to the casing. The inner end of lever 122 includes a shifter yoke 124 (Figure 10) engaged in the groove 125 of compound gear 64. The oposite end of lever 122 is engaged in a cam track 126 formed in the periphery of cam 127 (Figure 3). The track 126, as developed in Figure 4, provides three positions for gear unit 64 as the cam is rotated.

Cam 127 is connected to the spindle speed selector lever 34 as illustrated in Figures 3, 8 and 9. As shown, selector lever 34 is provided with a shaft 128 to which is fixed a gear sector 130. Gear sector 130 meshes with a gear 131 secured to shaft 132. The opposite end of shaft 132 carries a gear 133 which meshes with the gear teeth 134 formed on the end of cam 127. Lever 34 has three positions similar to lever 33 as shown in Figure 9 and when it is actuated it rotates the cam 127 to its three positions. As shown in Figure 3, gear 67 of unit 64 is in its intermediate speed position, meshing with gear 58. Rotation of the cam causes lever 122 to shift compound gear 64 to the right to mesh with its component gears 68 or 70.

As shown in Figures 4 and 10, cam 127 includes a series of detent notches 135 engaged by a roller 136 carried by lever 137. Lever 137 is pivotally mounted as at 138 and its opposite end is engaged by a tension spring 140 to urge roller 136 into engagement with notches 135. This arrangement latches the cam to maintain the gear in its selected position.

The shiftable compound gear unit 52 on shaft 50, which is controlled by the secondary range selector lever 33, is shifted by a shifter lever 141, actuated by a cam 143 having a track 144 to provide three positions. As shown in Figure 3, gear 52 is in its intermediate speed position with its gear 53 meshing with gear 61. It is shifted by means of a yoke 145 engaging the groove 146 of gear 52. Yoke 145 includes a slider 147 mounted upon a pair of slide rods 148. The swinging end of lever 141 connects with slider 148 by means of a pivot pin 150.

Cam 143 is actuated by selectors lever 33 in the following manner. As shown in Figures 3, 8 and 9, selector lever 33 is connected to a gear sector 151 in the same manner as is lever 34. Sector 151 meshes with a gear 152 (Figure 8) secured to a sleeve 153 telescopically mounted upon and rotatable relative to shaft 132. A gear 154 is secured to the inner end of sleeve 153 and meshes with the gear teeth 155 formed on the end of cam 143. Movement of lever 33 in either direction from the intermediate position shown causes rotation of cam 143 to shift compound gear 52 to the left to mesh with gear 58 or 60. Cam 143 is provided with a detent arrangement 156 (Figure 3) which follows the construction disclosed with reference to cam 127.

The range selector lever 32 shifts both the clutch and gear unit 71 and the compound gear unit 79. For this purpose a pair of cams 158 and 160 are driven in unison by means of lever 32. As shown in Figures 3 and 9, spiral gear sector 161 is secured to the shaft 162 of lever 32. Sector 161 meshes with a spiral gear 163 secured to the cam shaft 164 upon which is fixed the cams 158 and 160. The clutch and gear unit 71 is connected by a yoke 165 pivotally mounted as at 166 to the swinging end of a shifter lever 167. The opposite end of lever 167 is engaged in the track 168 of cam 158. The compound gear unit 79 is engaged by a yoke 169 carried by a slider 170 mounted upon the slide rods 148 and engaging the opposite sides of gear 81. Slider 170 is pivotally connected as at 171 to a shifter lever 173 having its opposite end engaged in the cam track 174 of cam 160. A detent arm 176, similar to that previously described, engages a series of notches in cam 160 to latch the cams 158 and 160 in their selected positions.

When the range selector lever 32 is shifted to the left from the intermediate position shown in Figure 3, cams 158 and 160 are rotated in unison causing lever 167, for clutch gear unit 71, to remain stationary with its gear 76 in mesh with the gear 72, since this portion of cam track 167 is straight. Cam track 174 of cam 160 however, will cause the shiftable component 79 to be shifted toward the right to mesh its pinion 86 with the large spindle gear 90. The drive then will be transmitted from shaft 77, gear 81, pinion 86, gear 90 to drive the spindle at its low speed range. When the lever 32 is shifted to the right, cam track 168 of cam 158 will cause its lever 167 to shift the clutch and gear unit 71 to the right to mesh gear 76 with clutch teeth 74, thus driving the spindle directly from shaft 62, gear 74 to spindle gear 89. Shifting the lever to the right also causes track 174 of cam 160 to shift the component 79 to a neutral position.

From the foregoing it will be observed that when the range selector lever 32 is operated, the cams 158 and 160 automatically shift the clutch and gear unit 71 and compound gear 79 in predetermined sequency to provide the three ranges. Thus, when the lever is shifted to its left-hand position to select the low speed range, clutch and gear unit 71 remains in its left-hand position in mesh with gear 72 and shiftable compound gear unit 79 is shifted to the right to mesh pinion 86 with spindle gear 90. Thus, the low speed ratio is established from shaft 62, gear 76 to gear 72, driving shaft 77 at reduced speed and from shaft 77 through the elongated gear 80 to gear 81 and from pinion 86 to spindle gear 90. This provides maximum gear reduction from shaft 62 to the spindle shaft. The several secondary range and spindle speeds for the low speed range are established by the shiftable compound gears 52 and 64 to establish a series of speed changes between the input shaft 50 and shaft 62.

When the range selector lever is in its intermediate position, the gear and clutch unit 71 remains in mesh with gear 72 to drive elongated gear 80 as above described. In this instance however, the component gear 79 is shifted to the left to mesh large gear 81 with the spindle pinion 87 to provide the intermediate range. When the lever is shifted to its right-hand limit for the high speed range, cam 158 shifts the clutch and gear unit to the right to couple shaft 62 directly to gear 74 which meshes with spindle gear 89 to drive the spindle directly from shaft 62 instead of through the back gear unit 79. In order to permit this operation, the compound back gear unit 79 is shifted to a neutral position.

By virtue of the range selector lever 32, in combination with the color selector lever 33, various gear changes are achieved with maximum convenience and dispatch since each selection is made directly without passing the various gears through a sequence of changes. Thus, when the range selector lever is actuated, it shifts the gears 71 and 79 to establish the gear train for the selected range. The secondary range selector lever 33 is moved with reference to its color index plate to coincide with the color for the required spindle speed. This shifts the three speed compound gear 52 to one of its three positions to provide a secondary range. The spindle speed is selected when the speed selector lever 34 is moved to a position with reference to the index plate 36 in alignment with the desired group of three colors. This shifts the three speed shiftable gear unit 64 into mesh with one of its mating component gears 58, 68 or 70 to provide the selected speed.

When the transmission is assembled for eighteen speeds instead of twenty-seven, the two speed selector gear 52a is installed. In this instance, the secondary range selector lever 33 is provided with two positions instead of three. In this case the color index plate 41 is provided with two colors instead of three and the index plate 35 correspondingly is in two colors instead of three as shown in Figure 14.

It will be observed that the shifting apparatus is of maximum simplicity and compactness and the manufacturer is able conveniently to furnish the lathe equipped for the desired speed simply by installing the proper speed change gear 52, 52a or 52b and by installing the necessary cam to provide two or three shifts or by omitting the cam entirely when the fixed gear 52b is installed.

Having described my invention, I claim:

1. In a head stock for a lathe or the like, a spindle, a gear train, a plurality of shiftable speed change gear units in said gear train to vary the spindle speed, a shifter arm operatively connected to each of said speed change gear units, two of said units being interrelated and adapted to be shifted relative to each other to provide a series of speed ranges, a cam shaft, a pair of cams fixed to said shaft and connected to the shifter arms of said interrelated speed change units, a selector lever in operative connection with said cam shaft to actuate said pair of cams in unison, a second group of cams loosely journalled on said shaft, individual selector levers operatively connected to said loosely journalled cams operable to shift the same independently of said fixed pair, and a respective shifter arm connected to said cams.

2. In a speed change transmission for a head stock or the like, a plurality of shiftable speed change gears, a cam connected respectively to each of said speed change gears for shifting the same, a cam shaft for mounting said cams, one group of said cams being fixed relative to said cam shaft and the other of said groups being loosely journalled thereon, a selector lever in driving connection with said cam shaft for actuating said first group of cams in unison, an operating shaft journalled adjacent said cam shaft and in driving connection with one of the cams loosely journalled on said cam shaft, a second selector lever operatively connected to said operating shaft and adapted to actuate said loosely journalled cam, a third selector lever for the other of said loosely journalled cams, and connecting means associated with said other of the loosely journalled cams and said third selector lever to actuate said cam independently of the other of said cams.

3. In a speed change transmission for a head stock or the like, a plurality of shiftable speed change gears, cams connected respectively to each of said speed change gears for shifting the same, a cam shaft for mounting said cams, said cams being arranged in groups relative to said cam shaft, one group of said cams being nonrotatably fixed to said cam shaft and the other of said groups being loosely journalled thereon, a selector lever in driving connection with said cam shaft for actuating said first group of cams, an operating shaft journalled adjacent said cam shaft and in driving connection with one of the cams loosely journalled on said cam shaft, a sleeve loosely journalled on said operating shaft and in driving connection with the other of said loosely journalled cams, and a pair of selector levers connected respectively one to the sleeve and one to the operating shaft and adapted to actuate the loosely journalled cams independently relative to each other and to the cam shaft.

4. In a speed change transmission for a head stock or the like, a plurality of shiftable speed change gears, cams connected respectively to each of said speed change gears for shifting the same, a cam shaft for mounting said cams, said cams being arranged in groups relative to said cam shaft, one group of said cams being nonrotatably fixed to said cam shaft and the other of said groups being loosely journalled thereon, a selector lever in driving connection with said cam shaft for actuating said first group of cams, an operating shaft journalled adjacent said cam shaft and in driving connection with one of the cams loosely journalled on said cam shaft, a sleeve loosely journalled on said operating shaft and in driving connection with the other of said loosely journalled cams, a pair of selector levers connected respectively one to the sleeve and one to the operating shaft and adapted to actuate the loosely journalled cams independently relative to each other and to the cam shaft, a detent mechanism associated with each of said loosely journalled cams, and a detent mechanism associated in common with the cams fixed to said cam shaft.

5. In a speed change transmission for a head stock or the like, a plurality of shiftable speed change gears, cams connected respectively to each of said speed change gears for shifting the same, a horizontal cam shaft for mounting said cams, said cams being arranged in groups relative to said cam shaft, one group of said cams being nonrotatably fixed to said cam shaft and the other of said groups being loosely journalled thereon, a selector lever, a vertical mounting shaft for said lever, a gear on said vertical mounting shaft, a mating gear on said horizontal cam shaft, a parallel operating shaft journalled adjacent said cam shaft and in driving connection with one of the cams loosely journalled on said cam shaft, a sleeve loosely journalled upon said operating shaft and in driving connection with the other of said loosely journalled cams, a pair of horizontally disposed and rotatably journalled shafts each having a gear and a selector lever mounted thereon, a gear on said sleeve and a gear on said actuating shaft each in mesh with one of the gears on the horizontally disposed and rotatably journalled shafts, whereby the sleeve and actuating shafts are adapted to be actuated independently by the respective selector levers and thereby provide individual actuation for each of the loosely journalled cams.

6. In a speed change transmission for a head stock or the like, a plurality of shiftable speed change gears, cams connected respectively to each of said speed change gears for shifting the same, a horizontal cam shaft for mounting said cams, said cams being arranged in groups relative to said cam shaft, one group of said cams being nonrotatably fixed to said cam shaft and the other of said groups being loosely journalled thereon, a selector lever, a vertical mounting shaft for said lever, a spiral gear on said vertical mounting shaft, a mating gear on said horizontal cam shaft, a parallel operating shaft journalled adjacent said cam shaft and in driving connection with one of the cams loosely journalled on said cam shaft, a sleeve loosely journalled upon said operating shaft and in driving connection with the other of said loosely journalled cams a pair of horizontally disposed and rotatably journalled shafts each having a gear and a selector lever mounted thereon, a gear of said sleeve and a gear of said actuating shaft each in mesh with one of the gears on the horizontally disposed and rotatably journalled shafts, whereby the sleeve and actuating shaft are adapted to be actuated individually by the respective selector levers and thereby provide individual actuation for each of the loosely journalled cams.

7. In a head stock for a lathe or the like, a casing, an input shaft journalled in said casing, a spindle journalled in said casing, a gear train connecting said input shaft to said spindle, shiftable range selector gears in said gear train, a secondary shiftable range selector gear in said transmission, a spindle speed selector gear in said transmission, an individually shiftable selector lever operatively connected with each of said shiftable gears, a spindle speed indicating plate associated in common with said selector levers having indications of the respective spindle speeds for the various combinations of lever positions, said primary range selector lever and spindle speed selector lever being arranged to operate directly with reference to the speed indications on said indicating plate, and an indexing plate associated with said secondary range selector lever, said plate having indications for the range positions of said lever correlated with indications on said speed indicating plate to provide direct indications of the spindle speed for the selector lever positions in combination with each other.

8. In a head stock for a lathe or the like, a spindle, a gear train for driving said spindle, a shiftable range selector gear in said gear train, a secondary shiftable range selector gear in said transmission, a shiftable spindle speed selector gear in said transmission, an individual selector lever operatively connected with each of said shiftable gears, a spindle speed indicating plate associated in common with said selector levers having horizontal and vertical indications of the respective spindle speeds for the various combinations of lever positions, said primary range selector lever and spindle speed selector lever being arranged to swing respectively in horizontal and vertical paths relative to said horizontal and vertical spindle speed indications, an indexing plate associated with said secondary range selector lever, said plate having color indications for the speed range positions of said lever, said speed indicating plate having duplicate color indications associated with said individual spindle speed indications to indicate by color the spindle speed for the several positions of the secondary range selector lever.

WILLIAM G. HOELSCHER.

REFERENCES CITED

The following references are of record in the file of this patent:

UNITED STATES PATENTS

| Number | Name | Date |
|---|---|---|
| Re. 21,412 | Senger | Mar. 26, 1940 |
| 1,345,497 | Kempin | July 6, 1920 |
| 1,686,240 | Klausmeyer | Oct. 2, 1928 |
| 1,758,427 | Burger | May 13, 1930 |
| 1,813,002 | Van Hamersweld | July 7, 1931 |
| 1,817,724 | Van Hamersweld | Aug. 4, 1931 |
| 1,991,349 | Gallimore | Feb. 2, 1935 |
| 2,278,263 | Hoelscher | Mar. 31, 1942 |
| 2,332,381 | Hoelscher | Oct. 19, 1943 |
| 2,387,417 | Sundt | Oct. 23, 1945 |
| 2,465,942 | Von K. Sundt | Mar. 29, 1949 |

FOREIGN PATENTS

| Number | Country | Date |
|---|---|---|
| 526,623 | Great Britain | Sept. 16, 1940 |